United States Patent [19]

Hayashi

[11] Patent Number: 4,756,487

[45] Date of Patent: Jul. 12, 1988

[54] SPIN CAST REEL WITH REAR DRAG ADJUSTMENT

[75] Inventor: Yukio Hayashi, Tokyo, Japan

[73] Assignee: Isuzu Kogyo Co. Ltd., Japan

[21] Appl. No.: 80,612

[22] Filed: Aug. 3, 1987

[51] Int. Cl.4 .................. A01K 89/01; A01K 89/02
[52] U.S. Cl. ...................... 242/84.2 H; 242/84.5 A; 242/84.5 R
[58] Field of Search .............. 242/84.5 R, 84.5 A, 242/84.5 P, 84.2 R, 84.2 A, 84.2 H, 211, 221

[56] References Cited

U.S. PATENT DOCUMENTS

| | | | |
|---|---|---|---|
| 2,600,558 | 6/1952 | Mauborgne | 242/84.5 A X |
| 2,745,607 | 5/1956 | Taggart et al. | 242/84.5 R X |
| 2,988,298 | 6/1961 | Purnell | 242/84.5 R |
| 3,126,167 | 3/1964 | Kiyomi Ide | 242/84.5 P X |
| 3,222,010 | 12/1965 | Borgström et al. | 242/84.2 A |
| 3,411,230 | 11/1968 | Hopper | 242/84.2 A X |
| 3,948,465 | 4/1976 | Scusa | 242/84.5 R X |

Primary Examiner—Stanley N. Gilreath
Assistant Examiner—Joseph J. Hail, III
Attorney, Agent, or Firm—Melvin R. Stidham

[57] ABSTRACT

The disclosure is of a spin-cast reel wherein a spool is slidably and rotatably carried on an axial body extension. A rotary shaft carrying the rotor is coaxially mounted in the extension and a drag control knob is mounted at the back of the reel body, also on the axis of the rotary shaft. The drag control knob carries a nut that moves along a threaded rod which, in turn, forces the legs of a U-shaped member against a disc spring to apply a drag force against the side of the spool. Thus, the drag can be controlled from the rear of the reel and on the axis of the spool and rotor.

3 Claims, 1 Drawing Sheet

U.S. Patent    Jul. 12, 1988    4,756,487
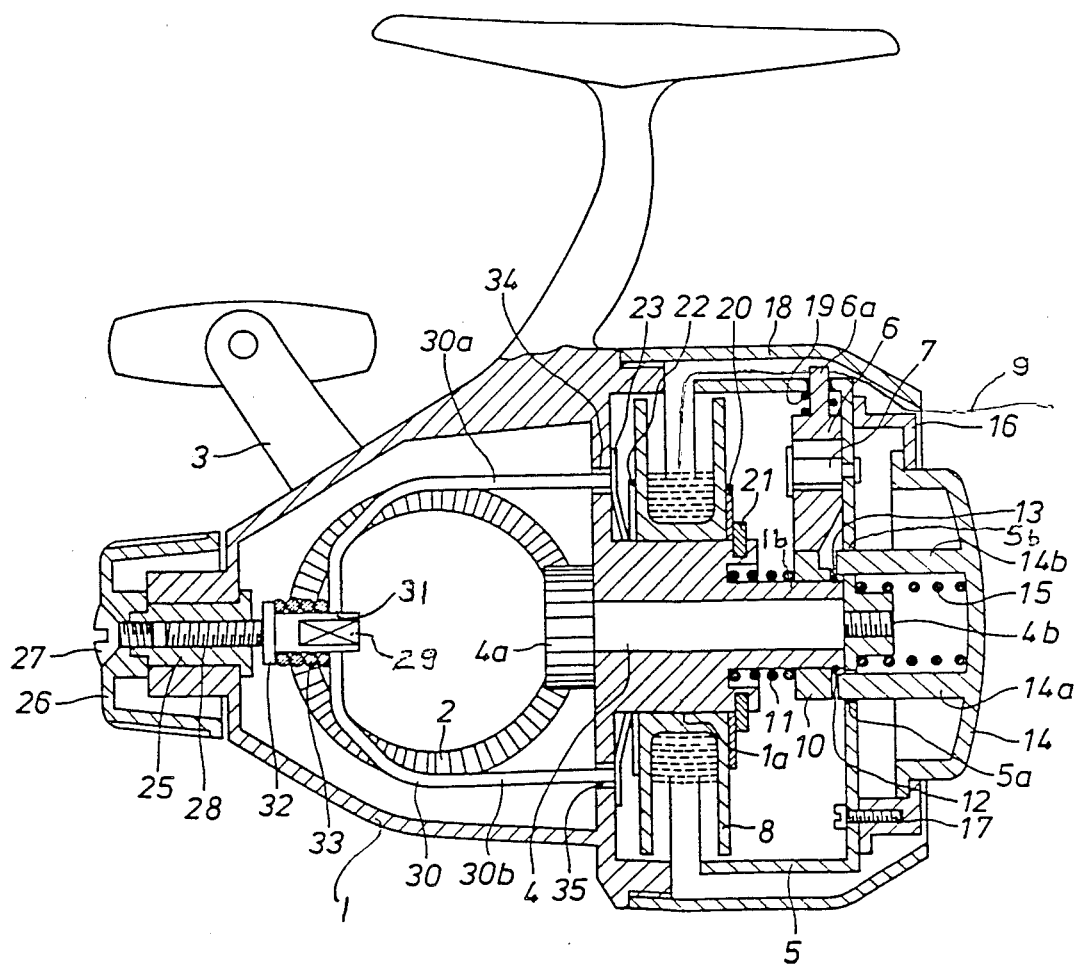

SPIN CAST REEL WITH REAR DRAG ADJUSTMENT

BACKGROUND OF THE INVENTION

A fishing reel with an enclosed rotor and spool wherein the enclosure has a port through which the fishing line is guided is generally referred to as a closed face or spin-cast reel. This invention relates to such a fishing reel. Customarily, the fishing line is released from the line pickup unit for casting by pushing a button located at the rear part of the reel body. After casting, the pickup unit may be reset for rewinding by rotating the rotor with a handle or crank. Since the spin-cast reel is generally used with a fishing rod having a grip for spincasting, it is possible to operate it with one hand by using the thumb of that hand to push the release button, which is located at the rear of the reel body.

Usually, the drag unit on a reel of this type is operated from one side and pressure is controlled by pushing a leaf spring or disc spring working on one side of a spool of the reel. This action is liable to generate uneven rotation of the spool and, often, breakage of the fishing line.

SUMMARY OF THE INVENTION

It is an object of the present invention to provide a spin-cast reel wherein the drag control force applied to the spool will never be uneven.

Other objects and advantages of this invention will become apparent from the description to follow, particularly when read in conjunction with the accompanying drawing.

In accordance with the present invention, a drag control knob is provided at the rear of the reel, on the axis of rotation of the spool, and as the control knob is turned manually, it acts to apply forces along both legs of a U-shaped member, which is located symmetrically with the axis of the drag control knob. The forces are applied against a disc spring or an annular sliding plate to apply a drag evenly and symmetrically to and around the spool.

BRIEF DESCRIPTION OF THE DRAWING

The drawing is a longitudinal sectional view of a spin-cast reel manufactured in accordance with the present invention.

DESCRIPTION OF THE PREFERRED EMBODIMENT

In the spin-cast reel body 1 of the present invention, a large gear 2, which is mounted on a shaft in the reel body 1, is rotated by a handle or crank 3 to drive a pinion 4a. The pinion 4a is fixed on a main rotary shaft 4 on the other end of which 4b is non-rotatably carried the rotor 5, as by means of a threaded connection.

A pickup pin or cam follower 6 is attached to the rotor 5 to rotate therewith, with limited radial movement of the pickup pin or cam follower being limited by a rivet 7. The spool 8 is slidably and rotatably carried on an axial extension 1a in the reel body, but is normally held against rotation by the improvement to be described. While the spool is so held, the fishing line 9 is wound onto the spool 8 as the rotor 5 rotates, the pickup pin or cam follower 6, as shown, riding on the large diameter portion of a pickup cam 10. In such position, the tip 6a of the pickup finger 6 is extended to engage and wind the fishing line 9 onto the spool 8. A spring 19 biases the cam follower 6 against the aligned surface of the pickup cam 10.

The leading portion 1b of the forward axial extension 1a is flattened at both sides to form a key that slidably receives the pickup cam 10 which is thereby fixed against rotation on the reel body 1. The pickup cam 10, being free to move axially on the extension 1b is biased in a forward direction by the spring 11, but such forward movement is limited by a stop ring 13, which is received in a groove 12 formed in the keyed extension 1b.

Holes 5a, 5b, etc, are formed in the front face of the rotor 5 to receive pins 14a, 14b, etc, which extend rearward from a push button 14. The pins 14a, 14b, etc, are on an internal circle which is of a diameter larger than that of the fixed, keyed axial extension 1b, but smaller than that of the large diameter portion of the pickup cam 10. The push button 14 when the rotor 5 is being rotated, is urged forwardly by a spring 15 and, in the forward position shown in the drawing, the pins 14a, 14b, etc, do not contact the pickup cam 10. This forward movement of the push button 14 is limited by a holding ring 16, which is attached to the rotor 5, by means of a screw 17 or the like to rotate therewith on rewinding. This holds the push button 14 at an appropriately protruded position extending from the front of the reel body cover 18. An annular opening around the push button 14 serves as the line guide port for the fishing line 9.

According to the present invention, the spool 8 is slidably mounted on the stationary axial body extension 1a and forward movement of the spool 8 is limited through a sliding plate 20 engaging a stop ring 21. The rear end portion of the spool 8 is urged forward by a disc spring 23 acting through another sliding plate 22, squeezing the spool 8 between the sliding plates 20 and 22, thus applying a drag force to the spool 8 to resist rotation of the spool under the force of a hooked fish.

A drag adjustment nut 25 is rotatably carried in the body 1 and a drag control knob 26 is fixed at the rear end of the nut 25 by means of a screw 27. The exterior surface of the knob 26 is preferably provided with an ordinary drag scale so that the knob 26 may be turned to a selected setting. A screw 28 threadedly engaged with the nut 25 has a rectangular portion 29 at the front end thereof, which is engaged with a key hole 31 located at the center of the rear part of a U-shaped member 30. A coil compression spring 33 is engaged between a collar 32 on the screw 28 and the rear surface of the U-shaped member 30, to bias the U-shaped member 30 forward. Both legs 30a and 30b of the U-shaped member 30 contact the rear end of the disc spring 23 through holes 34 and 35 in the reel body 1, thereby to strengthen the drag by pushing the lead disc spring 23.

The present invention being constituted as described above, when the fishing line 9 is wound up by turning the crank or handle 3 to rotate the rotor 5, the spring 11 pushes the cam 10 forward so that, as the pickup pin 6 rotates, it has its radial inner end in contact with the large diameter portion of the pickup pin cam 10. The fishing line 9 is caught by the protruding outer end 6a of the pickup pin 6, which while riding on the large diameter portion of the cam 10, has its outer end 6a extending radially outward of the rotor 5.

Preparatory to casting the fishing line 9, the push button 14 is pushed from the front against the pressure of the spring 15 with the forefinger of the hand holding the fishing rod whereby the pickup cam 10 is moved back from the position shown, by means of protruding pins 14a, 14b, etc, and the cam follower 6 drops down onto the eccentric smaller diameter portion of the cam 10 to retract the pickup pin tip 6a radially by means of the spring 19. The retracting movement of the cam follower pickup pin 6 is limited by the rivet 7 to the position wherein the catching outer end or tip 6a becomes almost level with the external surface of the rotor 5. With the pickup pin 6 in this position, the fishing line 9 may be unreeled from the spool 8 without engaging the pickup pin tip 6a. Thus, the fishing line 9 runs out of the spool 8, around the outer surface of the rotor 5, and out the opening between the push button retention ring 16 and the cup-like cover or enclosure 18. Accordingly, if the fisherman keeps his fore-finger in touch with the push button 14, after pressing it he can quickly move the forefinger to catch the line to hold it as desired until the instant of release. After the fishing line 9 has been cast, and the crank 3 is turned, the rotor 5 is rotated to rotate the pickup pin 6. The spring 11 snaps the pickup cam 10 forward so that the pickup pin follower 6 leaves the small diameter portion and moves to the large diameter portion of the pickup cam 10 as soon as the cam surfaces are aligned. With the cam follower or pickup finger 6 on the large diameter surface of the cam 10, the line-catching outer end 6a of the pickup pin 6 protrudes beyond the outer surface of the rotor 5, whereby the fishing line 9 is caught and wound onto the spool 8 as described.

The spool 8 can be rotated by a pull on the line 9 sufficient to overcome the drag imposed against the sides of the spool 8 by the sliding rings 20 and 22. In order to adjust the drag, the knob 26 is turned manually until set at a required scale. When the knob 26 is rotated, the nut 25, which is fixed to the knob 26, is rotated with it, thereby threading the screw 28 to the right or to the left. Accordingly, the force of the spring 33 against the U-shaped member 30 is increased or decreased, and the force transmitted by and along the legs 30a and 30b of the U-shaped member 30 and against the disc spring 23 is also increased or decreased. This adjusts the amount of drag applied by the disc spring 23 to the spool 8. Because the legs 30a and 30b are symmetric with the axis of the rotary shaft 4, the U-shaped member 30 applies a uniform and symmetrical force to the disc spring 23.

Either one of the coil spring 33 or the disc spring 23 may be omitted in order to simplify the construction, and when the disc spring 23 is so omitted, the legs 30a and 30b are modified as necessary to cause both to press against the sliding plate 22.

As is apparent with above description, in accordance with the present invention, a drag knob is provided on the axis 4 of the rotor 5, and the spring pressure from the knob 26 is applied to the spool through the disc spring 23 or the sliding plate 22 at plurality of locations that are symmetric with that axis, thereby to achieve a uniform and smooth drag effect.

Furthermore, it is easy to enlarge the drag control range by selecting the force of the disc spring 23 or the coil spring 33 and making the rotary angle of the drag control knob larger.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A spin-cast reel comprising:
   a reel body;
   a fixed cylindrical, forward extension on said reel body;
   a spool slidably and rotatably carried on said forward extension;
   means forming a coaxial bore through said forward extension;
   a rotor shaft rotatably carried in, and extending through said coaxial bore;
   a rotor fixed on said rotor shaft forward of said forward extension;
   a pinion in said body fixed on said rotor shaft rearward of said forward extension;
   a drive gear mounted in said body for rotation about an axis transverse to said rotor shaft;
   said drive gear meshing with said pinion to drive said rotor independently of said spool;
   a pair of front and rear drag rings slidable on said forward extension on opposite sides of said spool;
   a stop member on said forward extension to limit forward sliding movement of said front drag ring;
   a drag control knob rotatably carried on the rear of said body coaxially with said forward extension;
   an internally threaded, coaxial bore in said control knob;
   a drag force-transmitting member slidably and non-rotatably carried in said body and having a central portion coaxial with and threadedly engaged by said control knob and at least two legs diverging forwardly and symmetrically from said central portion around said pinion to engage and deliver a drag force to said rear sliding drag ring.

2. The spin-cast reel defined by claim 1 including:
   spring means interposed between said central portion and said diverging legs of the force-transmitting member.

3. The spin-cast reel defined by claim 1 including:
   a disc spring interposed between the legs of said force-transmitting member and said rear sliding drag ring.

* * * * *